July 24, 1951  A. KELLER ET AL  2,562,041
SEAT CONSTRUCTION
Filed Jan. 14, 1948  2 Sheets-Sheet 2
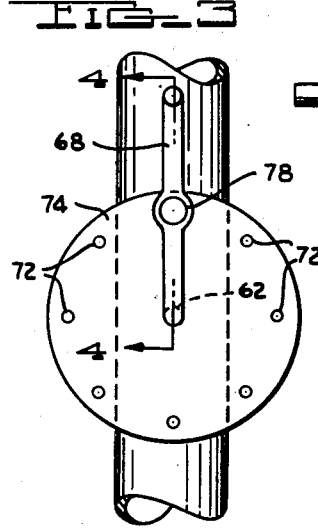
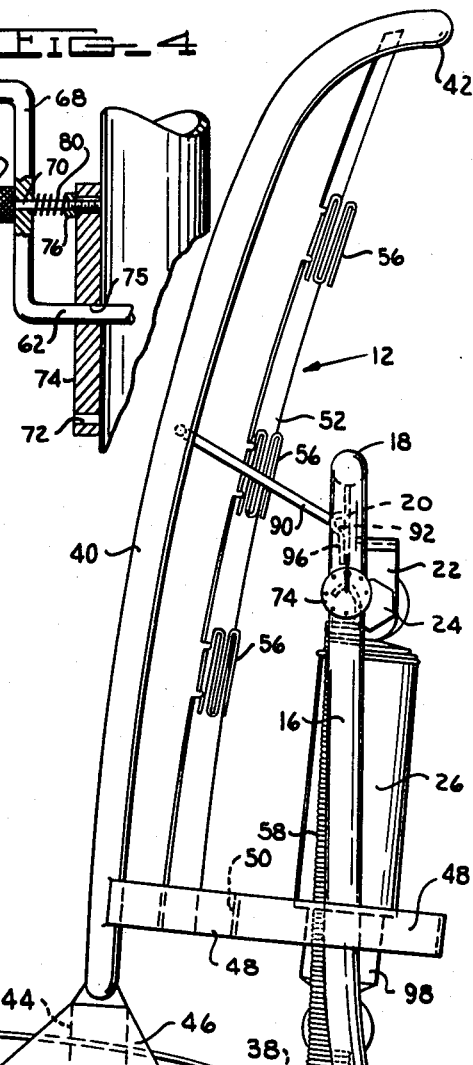
INVENTORS
AUGUST KELLER
JOHN VOTYPKA
BY
ATTORNEY Patented July 24, 1951

2,562,041

UNITED STATES PATENT OFFICE 2,562,041

SEAT CONSTRUCTION

August Keller, Dearborn, and John Votypka, Detroit, Mich., assignors, by mesne assignments, to Detroit Harvester Company, Detroit, Mich., a corporation of Michigan Application January 14, 1948, Serial No. 2,188

4 Claims. (Cl. 155—53)

The present invention relates to improvements in a seat construction and more particularly to a seat having an integral back and seat portion resiliently suspended from a rigid frame whereby objectionable shocks, jars, and vibrations are resiliently cushioned. The construction is such that the only appreciable relative movement occurs between the rigid supporting frame and the seat and back which move as a unit relative to said frame. Such relative movement as is permitted between the seat and back portion is the limited movement permitted by the compression of the springs in the seat portion. Such seats are adapted for use particularly in any type of moving vehicle or in other instances where it is desired to cushion the user against vibrations from stationary machines or the like. The present construction likewise may be employed in chairs, davenports and the like, or in general wherever a resiliently mounted seat is desired.

In such motor vehicles, as heavy trucks, busses and the like, impacts from the road are transmitted with considerable force to the driver's seat. In such instances, it is particularly desirable to cushion these impacts by resiliently floating the driver's seat relative to the rigid structure of the vehicle. One of the primary problems involved in such a construction is to stabilize the movement of the integral seat-back structure, particularly to minimize to and fro and rocking movements, yet to preserve adequate absorption of the vertical impacts transmitted to the seat.

An object of the present invention is to provide an improved seat construction wherein an integral seat and back structure is resiliently suspended from a rigid frame, the seat being resiliently supported from the front and rear, and the relative elasticity of the front and rear resilient seat supports being adapted to limit the vertical movement of the front portion of the seat relative to the rear thereof, thereby to avoid the tendency of changing the angular position of the seat relative to the supporting frame.

Another object of the present invention is to provide a resiliently floated integral seat and back structure wherein the tension in the primary load-supporting springs therefor are readily adjustable for predetermined positions of the seat relative to its rigid supporting frame, so as to adapt the seat for persons of different weights.

Another object of the present invention is to provide a seat having an integral seat and back construction resiliently floated for vertical springing movement, wherein rocking and horizontal movements of the integral seat-back structure is minimized.

Another object of the present invention is to provide shock absorber means for cushioning the upward rebound of the resiliently floated seat-back construction.

Other objects of this invention will appear in the following description and appended claims, reference being had to the accompanying drawings forming a part of this specification wherein like reference characters designate corresponding parts in the several views.

In the drawings:

Fig. 2 is essentially a fragmentary side view of the seat construction shown in Fig. 1, the seat springs being shown in position.

Fig. 3 is a fragmentary enlarged elevation of the detent means for selectively adjusting the seat for persons of different weights, taken in the direction of the arrows along the line 3—3 of Fig. 1.

Fig. 4 is essentially a fragmentary section taken in the direction of the arrows along the line 4—4 of Fig. 3.

Fig. 5 is essentially a fragmentary enlarged top view showing the attachment of the seat springs to the seat and taken in the direction of the arrows along the line 5—5 of Fig. 2.

Figure 1:
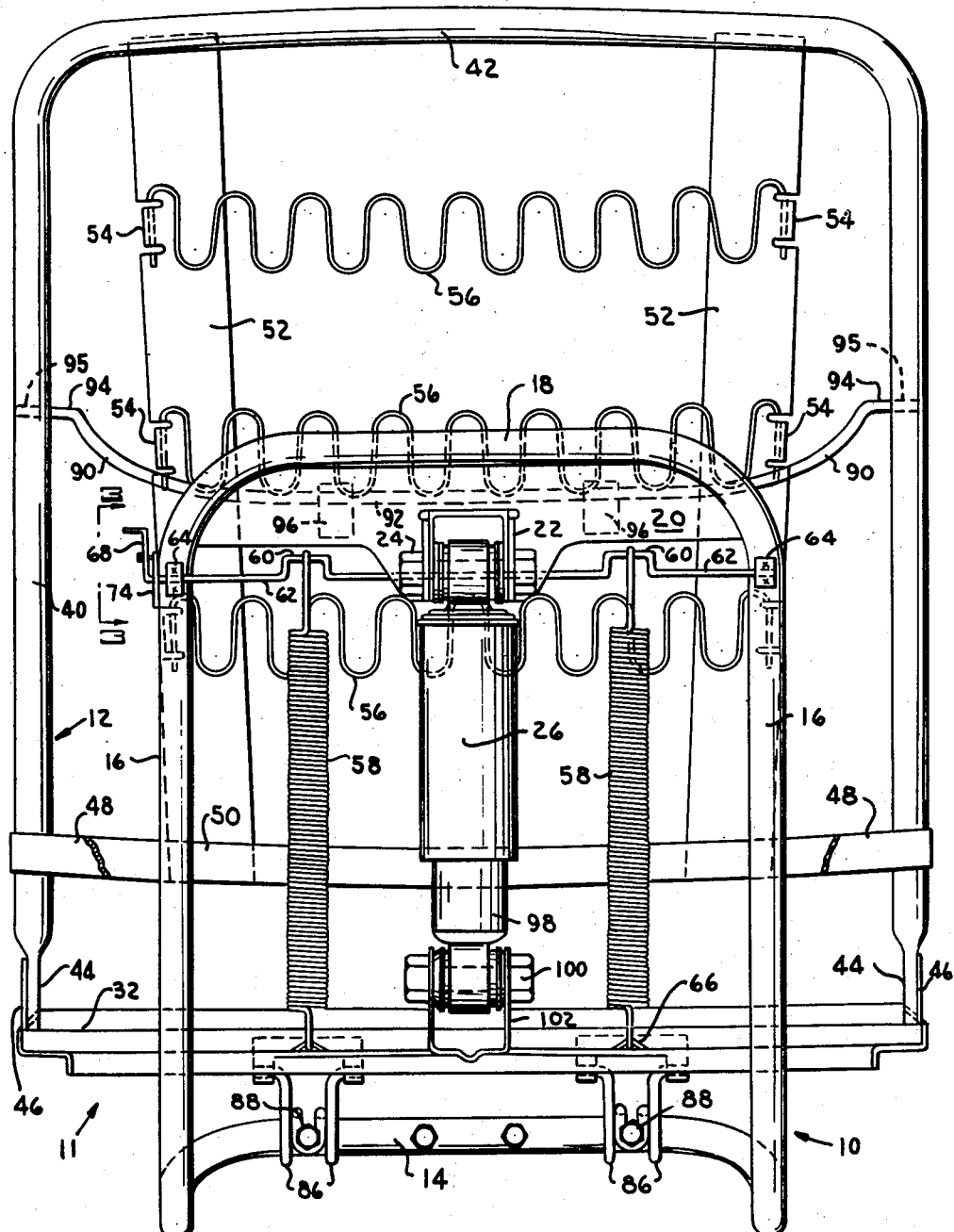
Fig. 1 is essentially a rear view, with portions broken away, of a seat construction embodying the present invention, the upholstery and seat springs being removed.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular embodiment of the present invention is shown by way of example in the drawings wherein an essentially tubular rigid frame structure, indicated generally by the numeral 10, is adapted to support the integral seat and back structures, indicated generally by the numerals 11 and 12 respectively.

The frame 10 includes the pair of horizontal tubular base members 13 which extend from front to rear below the lateral portions of the seat 11 and are joined at their forward ends by the horizontal tubular cross support 14. The latter extends parallel to the forward edge of the seat 11 somewhat below and to the rear thereof. The rear portions of the paired base members 13 curve upward and complete an integral construction with the paired tubular uprights 16, which latter are joined at their upper portions by the essentially horizontal tubular cross brace 18. A flat plate 20 is disposed below and secured, as by welding for example, to the cross brace 18 and to the downwardly curved end portions thereof which join with the uprights 16, to provide a reinforced support for the U-bracket 22 which carries the pivot bolt 24 for the upper pivotal mounting of the shock absorber outer cylinder 26.

The seat 11 comprises the essentially horizontal rectangular seat frame 32, having the lateral edges slightly converging from rear to front, and preferably comprising an all-welded construction of reinforced light gage steel. The seat springs 34 are preferably a plurality of convoluted spring wire constructions extending from the front to rear of the seat frame 32, Figs. 2 and 5, with the convolutions extending horizontally and transverse to the length of the springs 34. The front and rear ends of each spring 34 are hooked under the tongues 36 and 38 respectively, which are conveniently formed from the forward and rear edge members of the seat frame 32. Each of the plurality of tongues 36 for example is an integral projection from the forward edge of the seat frame 32, formed by a U-shaped cut therein and projected upward and forward over the respective terminal convolution of one of the coil springs 34, Fig. 5. The tongues 38 may be similarly formed to extend upward and rearward from the rear edge of the seat frame 32 so as to hook the rear terminal convolutions of the springs 34. The tension within each spring 34 is directed to bow the body thereof upward from the seat frame 32, thereby to hold the terminal convolutions of each spring 34 resiliently in hooked engagement with the corresponding tongues 36 and 38.

The back structure 12 comprises the pair of lateral arched upright tubular members 40 which curve sharply rearward at their upper portions and join the opposite ends of the essentially horizontal upper tubular cross bar 42. The lower portions of the back uprights 40 are flattened at 44 and secured to the lateral portions of the seat frame 32 at locations appreciably forward from the rear edge of the frame 32, Fig. 2. The junctures between the back uprights 40—44 and the lateral edges of the seat 32 are reinforced by the webs 46 to provide a rigid integral seat back frame movable as a unit.

An essentially horizontal U-shaped upholstery supporting bracket 48 is secured at its opposite ends to the lower portions of the back uprights 40 and extend rearwardly around the frame uprights 16. Similarly, a second essentially horizontal bracket 50, rearwardly bowed to conform to the desirable side to side concavity of the resilient reinforcing structure of the back 12, is secured at its opposite ends to the lower portions of the back uprights 40 to provide a lower support and attachment for the pair of upright rearwardly inclined supports 52. The supports 52 are symmetrically disposed on opposite sides of the midline of the back structure 12 with their upper ends secured to the upper cross bar 42. The horizontal sections taken through the surfaces of the supports 52 are adapted to conform essentially to the bowed contour of the bracket 50, Fig. 2, and thereby to conform to the said concavity of the back 12.

A plurality of vertically spaced spring holding flaps 54 are provided in the lateral edge of each of the supports 52 for hooking the ends of the convoluted wire springs 56, which are similar in construction to the seat springs 34 and extend transversely to the back 12. The springs 56 are undertension tending to bow themselves rearward and thereby to hold the ends thereof resiliently in the hooked engagement shown with the flaps 54.

The principle weight of the seat 11 and its occupant are resiliently supported by the pair of load-supporting coil springs 58 which are pivotally secured to the eccentric crank portions 60 of the rotatable crank shaft 62. The latter is journaled near its opposite ends within the brackets 64 which are secured to the frame uprights 16. The lower ends of the coil springs 58 are secured by hook attachments 66 to the rear edge of the seat frame 32.

It is apparent that upon rotation of the crank shaft 62 by means of the crank arm 68, the upper attachments of the coil springs 58 will be raised or lowered, thereby providing a means for adjusting the resilient support for the seat 11 for persons of different weights. The crank shaft 62 may be selectively secured in one of a plurality of indexed positions by virtue of the detent pin 70 which extends through the crank arm 68 and into one of the plurality of annularly spaced indexing holes 72 provided therefor within the plate 74 and located around the axis of the crank shaft 62. The plate 74 is secured to the left hand frame upright 16, Fig. 1, and provides the opening 75 through which the crank shaft 62 passes. The detent pin 70 provides the annular movement limiting stop 76 and the knurled head 78, by which latter it is pulled from the indexing holes 72 against the resiliency of the coil spring 80 which coils around the portion of the pin 70 between the crank arm 68 and stop 76 and serves to spring press the pin 70 to the right in Fig. 4.

The forward edge of the seat 11 is resiliently supported by means of the spring arm 82 pivotally secured at its upper end within the depending bracket 84 which is secured to the underside of the seat frame 32. The spring arm 82 extends rearward and downward from its pivotal connection with the bracket 84 toward the horizontal front support 14, around which the arm 82 is coiled to form a coil spring 86. In the present illustration, two pairs of spring arms 82 are provided, each pair being comprised of a single length of spring wire as shown in Figs. 2 and 5, coiled around the support 14 and secured thereto by the bolt 88. In order to avoid forward tilting of the seat 11, the relative resiliencies of the coil spring 58, spring arm 82, and coil spring 86 are preferably adapted in consideration of the respective positions of these springs from the center of gravity of the loaded seat 11 so that the vertical springing movement of the forward edge of the seat 11 will be approximately one-half that of the rear edge of the seat 11 during ordinary operation.

The back 12 is spaced from the upright portion of the rigid frame 10 by the lateral forward extending portions 90 of the rod or link 92 and having co-axial end portions 94 journaled at 95 within the lateral back uprights 40. The body of the rod or link 92 extends rearwardly around the back springs 56 and lies adjacent the flat panel 28 to which it is pivotally secured by the brackets 96. By virtue of the rod or link 92 and lateral portions 90 thereof, vertical movement of the back structure 12 must necessarily be in an arc about the pivots 96, and the back 12 is maintained in spaced relationship with the frame 10. Accordingly, as the seat-back structure 11—12 moves downward against the resiliency of its supporting springs, forward or rearward movement is limited by the arcs of movement of both the lateral bar portions 90 about the pivots 96 and also of the spring arms 82 about the horizontal support 14, thereby avoiding the jack-knife action common to similar resiliently floated seats.

In order to reduce the springing motion of the seat, and particularly to dampen the upward rebound after a severe jolt, an hydraulic shock absorber, comprising the plunger 98 vertically movable within the outer cylinder 26, is disposed between the seat 11 and frame 10. The lower end of the plunger 98 is pivotally secured by the pivot bolt 100 to the U-bracket 102, which latter is secured to the rear edge of the seat frame 32.

By the foregoing, an improved, comfortable, conveniently adjustable resiliently mounted seat construction has been provided. It is believed that the advantages and application of the seat is apparent from the disclosure herein. The seat and back members may be upholstered or cushioned according to conventional practice. By reason of the location of the lateral attachments between the back 12 and seat 11, forward of the rear edge of the seat frame 32, the weight of the occupant of the seat 11 is supported essentially over the central and most resilient portion of the seat springs 34, assuring optimum comfort. Over rough roads, when the seat-back construction is under continual springing motion, the frequency of vibration and particularly the upward rebound is damped by operation of the hydraulic shock absorber 26—98 disposed between the rear edge of the seat 11 and the rigid frame 10.

The integral seat-back structure is resiliently floated for vertical movement against the resiliency of the supporting springs 58 and 82—86. However, the arms 90 and 82, movable in vertical arcs essentially in parallelism with each other, are particularly adapted to restrain the seat-back structure against to and fro and rocking movements without interfering with the resilient vertical springing movement. Forward tilting of the seat 11, tending to throw the occupant of the seat forward as the seat springs downward is also avoided by means of the spring support 82—86 which limits the vertical movement of the forward edge of the seat 11 to approximately onehalf the vertical movement of the rear seat edge. In addition, by rotating the crank shaft 62 and thereby raising or lowering the eccentric crank portions 60, the tension in the coil springs 58 may be selectively adjusted for a predetermined position of the seat 11. The crank shaft 62 is selectively held in one of a plurality of indexed positions by the detent mechanism including the pin 70 and plurality of detent holes 72.

Having thus described our invention, we claim:

1. In a seat construction, the combination of an integral seat and back structure, a rigid supporting frame therefor, a resilient forward seatedge support operatively disposed between said frame and the forward edge of said seat for resiliently supporting the latter, said forward seatedge support being located below and rearward of the forward edge of said seat, and including a plurality of resilient arms, each arm being pivotally secured at one end to the forward edge of said seat and being inclined downward and rearward toward said supporting frame for coiling around and ending in an attachment to the latter at the arm's other end, a resilient rear seatedge support operatively disposed between said frame and the rear of said integral seat and back structure for resiliently supporting the latter, said forward seat-edge support and said rear seatedge support having relative elasticities so that the vertical spring movement of said front seatedge is approximately one-half the vertical spring movement of said rear seat-edge when said seat is in ordinary use, and means to limit the horizontal to and fro movements of said integral seat and back structure and including a rigid back supporting means pivotally connected to said back and extending rearwardly therefrom to a pivotal connection with said frame, said back supporting means being adapted to extend approximately horizontally between said back and frame when said seat is in ordinary use.

2. In a seat construction, the combination of an integral seat and back structure, a rigid supporting frame therefor, a resilient forward seatedge support located below and rearward of the forward edge of said seat and including a plurality of resilient arms, each arm being pivotally secured at one end to the forward edge of said seat and being inclined downward and rearward toward said supporting means for coiling around and ending in an attachment to the latter at the arm's other end, a resilient rear seat-edge support operatively disposed between said frame and the rear of said integral seat and back structure for resiliently supporting the latter, means to limit the horizontal to and fro movement of said integral seat and back structure when occupied including a rigid back supporting means pivotally connected to said back and extending rearwardly therefrom to a pivotal connection with said frame and adapted to extend approximately horizontally between said back and frame when said seat is in ordinary use.

3. In a seat construction wherein a rigidly connected seat and back frame is resiliently supported from a rigid supporting frame, the combination of load supporting coil springs having their lower ends operatively connected to the rear of said rigid seat and back frame, load supporting spring means having portions operatively connected to said rigid supporting frame and the forward edge of said seat and back frame for supporting the latter, a link pivotally connected to the rear of said rigid seat and back frame and to said rigid supporting frame for guiding the movement of said rigid seat and back frame relative to said rigid supporting frame, a shaft rotatably mounted on said rigid supporting frame and having eccentric connections with the upper ends of said load supporting coil springs for supporting the rear of said rigid seat and back frame and for varying in cooperation with said link the amount of tension placed on said coil springs by the user of said seat.

4. The combination as claimed in claim 3 and being further characterized in that said shaft is journaled in said rigid supporting frame in an essentially horizontal position and said eccentric connections are each pivotally connected with an end of one of said coil springs whereby the tension in said coil springs for a predetermined position of said seat when occupied is adjusted by rotation of said crank shaft, and means are provided for selectively locking said crank shaft in its adjusted position.

AUGUST KELLER.
JOHN VOTYPKA.

REFERENCES CITED

The following references are of record in the file of this patent:

UNITED STATES PATENTS

| Number | Name | Date |
|---|---|---|
| 1,423,460 | Schreiber | July 18, 1922 |
| 1,770,321 | Mongeotte | July 8, 1930 |
| 2,177,363 | Flint | Oct. 24, 1939 |
| 2,306,289 | Vial et al. | Dec. 22, 1942 |
| 2,315,791 | Hialt et al. | Apr. 6, 1943 |
| 2,373,751 | Flint | Apr. 17, 1945 |
| 2,466,345 | Wyeth | Apr. 5, 1949 |
| 2,486,048 | McIntyre et al. | Oct. 25, 1949 |

FOREIGN PATENTS

| Number | Country | Date |
|---|---|---|
| 554,802 | Great Britain | July 20, 1943 |
| 634,647 | Germany | Sept. 1, 1936 |